(12) United States Patent
Wu

(10) Patent No.: US 7,379,763 B2
(45) Date of Patent: May 27, 2008

(54) AUTOMATIC SLIDING MECHANISM

(75) Inventor: Kuo-Hsiang Wu, Taipei (TW)

(73) Assignee: Quanta Computer Inc., Tao Yuan Shien (TW)

(*) Notice: Subject to any disclaimer, the term of this patent is extended or adjusted under 35 U.S.C. 154(b) by 508 days.

(21) Appl. No.: 11/045,053

(22) Filed: Jan. 31, 2005

(65) Prior Publication Data
US 2005/0288077 A1    Dec. 29, 2005

(30) Foreign Application Priority Data
Jun. 11, 2004  (TW) ............................... 93209319 A

(51) Int. Cl.
*H04M 1/00* (2006.01)
*H04M 9/00* (2006.01)

(52) U.S. Cl. .............................. 455/575.4; 379/433.12

(58) Field of Classification Search ................ 370/489, 370/331, 328, 353; 16/64, 66; 455/575.4, 455/90, 90.1, 348, 562.1, 513, 458, 455; 188/67; 439/159, 60; 420/633; 211/85.11; 348/373, 14.16; 720/703, 601
See application file for complete search history.

(56) References Cited

U.S. PATENT DOCUMENTS

| | | | |
|---|---|---|---|
| 4,707,832 A * | 11/1987 | Glenn et al. ................ 370/489 |
| 4,759,099 A * | 7/1988 | Morano et al. ................ 16/64 |
| 5,369,788 A * | 11/1994 | Nagai ....................... 455/575.4 |
| 5,529,148 A * | 6/1996 | O'Leary ....................... 188/67 |
| 6,370,362 B1 * | 4/2002 | Hansen et al. ............. 455/90.1 |
| 6,438,117 B1 * | 8/2002 | Grilli et al. .................. 370/331 |
| 6,615,449 B1 * | 9/2003 | Alvarez ........................ 16/66 |
| 6,795,409 B1 * | 9/2004 | Youssefmir et al. ........ 370/328 |
| 6,982,968 B1 * | 1/2006 | Barratt et al. ............... 370/328 |
| 7,043,259 B1 * | 5/2006 | Trott .......................... 455/458 |
| 7,062,294 B1 * | 6/2006 | Rogard et al. ........... 455/562.1 |
| 7,142,535 B2 * | 11/2006 | Kubler et al. ............... 370/353 |
| 7,181,257 B2 * | 1/2007 | Gordecki .................. 455/575.4 |
| 7,212,832 B2 * | 5/2007 | Yokota ....................... 455/513 |
| 2001/0024945 A1 * | 9/2001 | Inomata et al. ............... 455/90 |
| 2002/0039890 A1 * | 4/2002 | Kim ............................. 455/90 |
| 2004/0198307 A1 * | 10/2004 | Chang ........................ 455/348 |

* cited by examiner

*Primary Examiner*—Rafael Perez-Gutierrez
*Assistant Examiner*—Joseph Arevalo
(74) *Attorney, Agent, or Firm*—Rabin & Berdo, PC

(57) ABSTRACT

An automatic sliding mechanism is described. The automatic sliding mechanism includes a rail base, a sliding rod, an actuating device, and a sliding rod recovery device. The sliding rod couples to the sliding base and moves along the sliding base. The actuating device configured on the rail base locks or unlocks the sliding rod in the rail base. The sliding rod recovery device configured on the rail base provides a spring force to move the sliding rod.

12 Claims, 7 Drawing Sheets

AUTOMATIC SLIDING MECHANISM

RELATED APPLICATIONS

The present application is based on, and claims priority from, Taiwan Application Serial Number 93209319, filed Jun. 11, 2004, the disclosure of which is hereby incorporated by reference herein in its entirety.

BACKGROUND OF THE INVENTION

1. Field of Invention

The invention relates to a sliding mechanism and, in particular, to an automatic sliding mechanism for cell phones.

2. Related Art

Due to its convenience of carriage and communication at any time, cell phones have become very popular in daily life. Spurred by progress in science and technology and market competition, the cell phone has more powerful functions than before. For example, aside from the small monochromatic display screen for display text signals, there are also cell phones with large color display screens available for displaying, transmitting and receiving color images. Some of the cell phones with large color display screens on the market are panel-sliding cell phones that use rail devices to couple the display screen panels and the key panel. However, when a user operates such a cell phone, he or she has to manually push the panel to expose the operation keys. In this case, one needs to move fingers or use the other hand to slide the panel. Moreover, the panel has to slide all the way out before the operation, causing inconvenience. As the space inside the cell phone is very limited, wiggling often happens if the fixed part and the sliding part of the panel-sliding cell phone are coupled in a small region.

SUMMARY OF THE INVENTION

An objective of the invention is to provide an automatic sliding mechanism. The user of a cell phone with the disclosed automatic sliding mechanism can open the sliding part without changing the gesture of holding the cell phone. The sliding part automatically slides open as the user presses the actual release button provided on the sides of the fixed part of the cell phone.

Another objective of the invention is to provide an automatic sliding mechanism that solves the wiggling problem and enhances the stability by enclosing a rail base around a sliding rod.

A further objective of the invention is to use a rib and a ridge formed from a metal plate to strengthen the structure of the invention so that the invention can be used in heavy devices.

To achieve the above objectives, the disclosed automatic sliding mechanism contains a rail base, a sliding rod, an actuating device, and a sliding rod recovery device. The rail base is installed on the fixed part of a cell phone whereas the sliding rod is installed on the sliding part of the cell phone. The sliding rod is coupled to and slides along the rail base. The actuating device is installed on the rail base, comprising an actuating handle, a lock hole, a through hole, and an actuating handle recovery device. The actuating handle has a lever structure, pivotally installed on the rail base and rotating about a connecting hole. A hook and a release button are provided on opposite sides of the connecting hole of the actuating handle. The hook matches with the lock hole on the sliding rod. The release button is designed to unlock the hook from the lock hole. The through hole is provided on one side of the rail base so that the hook can lock into the lock hole of the sliding rod via the through hole. The actuating handle recovery device is installed at the connecting hole, coupling between the actuating handle and the rail base. It provides a spring force to the actuating handle so that the hook is pushed to the side of the sliding rod, locking into the lock hole thereon. The sliding rod recovery device is provided between the rail base and the sliding rod to provide a spring force for releasing the locked sliding rod. It also prevents the sliding rod from leaving the rail base.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

Figures 1A, 1B:
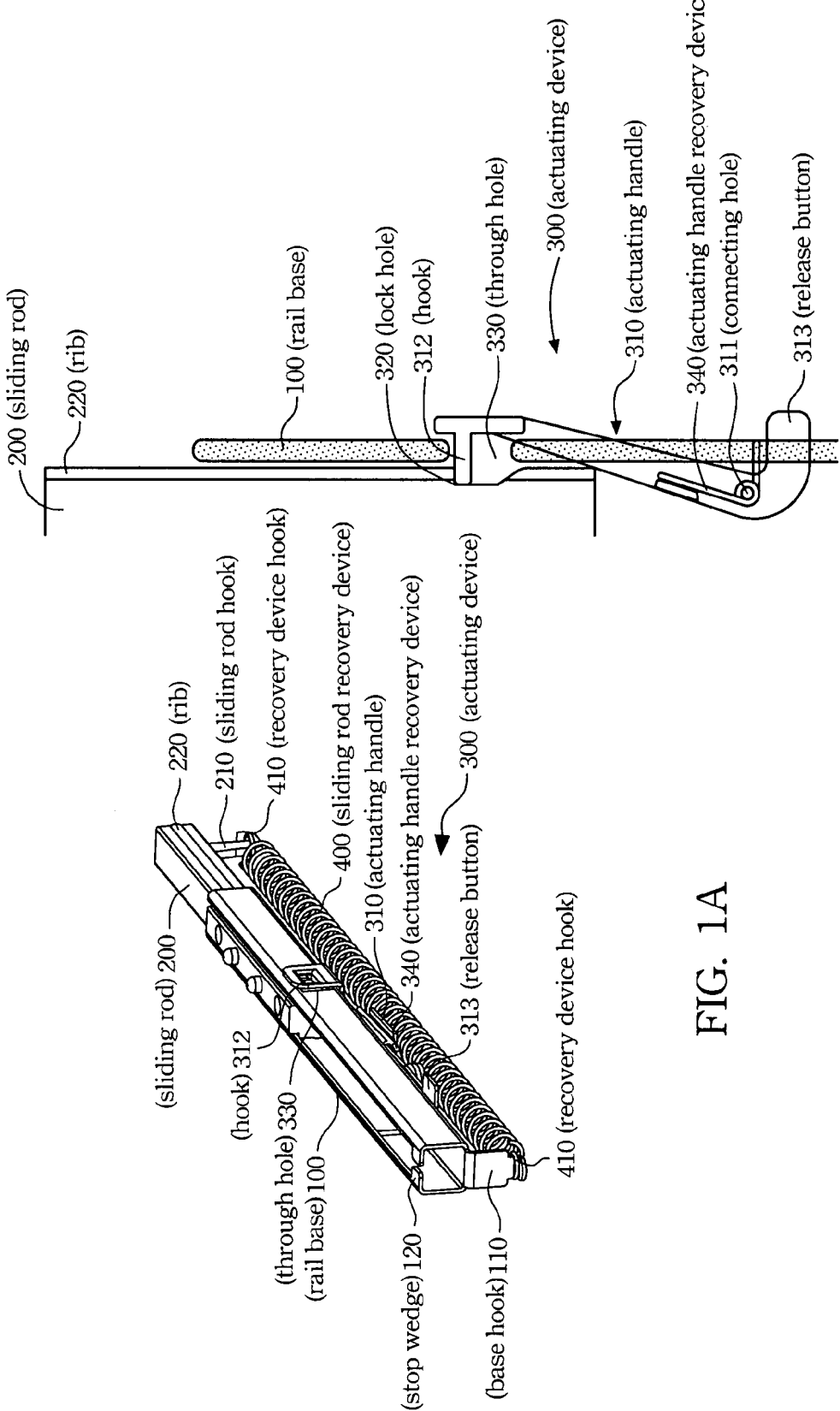
FIG. 1A is a three-dimensional view of the disclosed automatic sliding mechanism.
FIG. 1B is a magnified view of the actuating device in FIG. 1A.
Figures 2A, 2B:
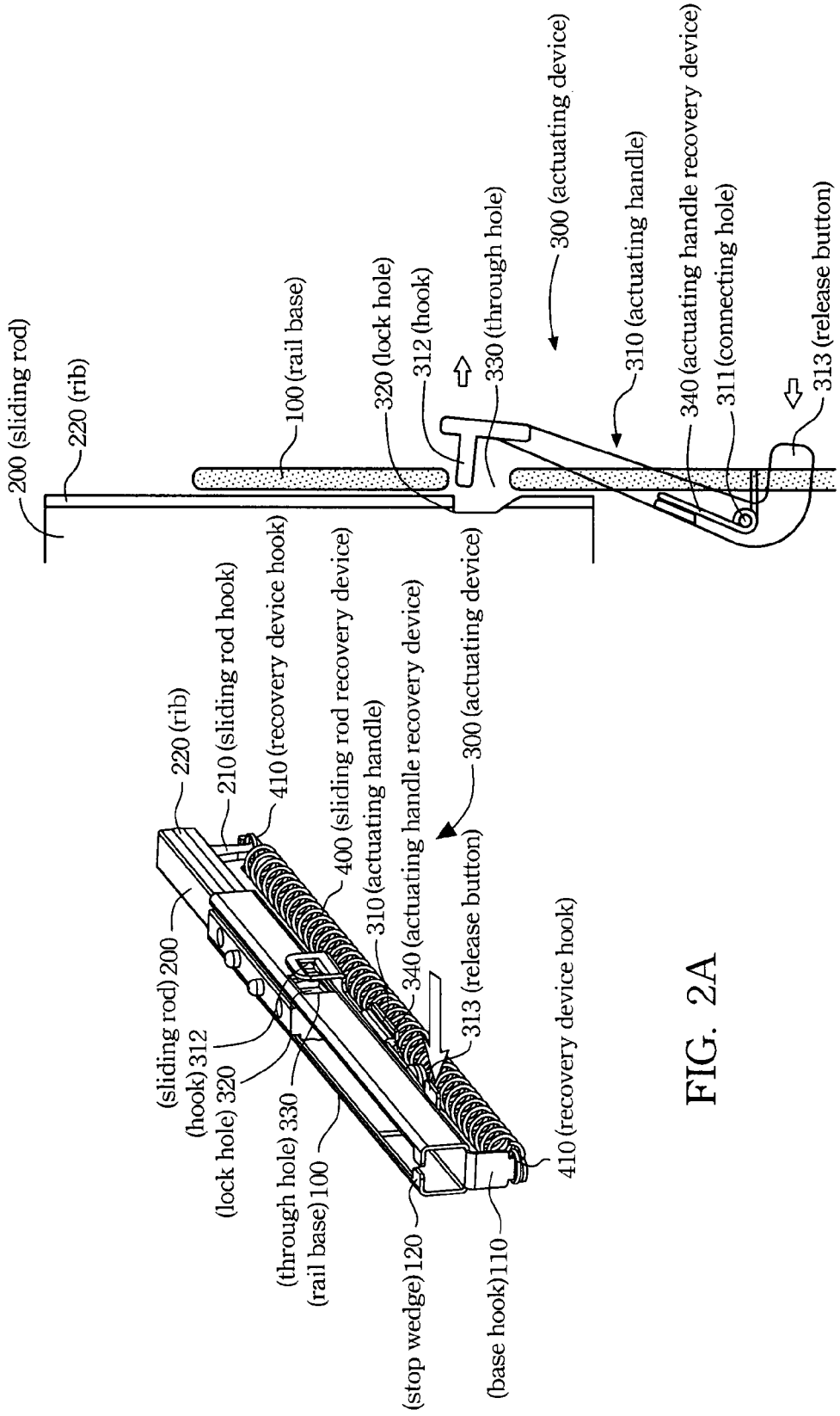
FIG. 2A is a three-dimensional view of operating the release button in the disclosed automatic sliding mechanism.
FIG. 2B is a magnified view of the actuating device in FIG. 2A.
Figures 3A, 3B:
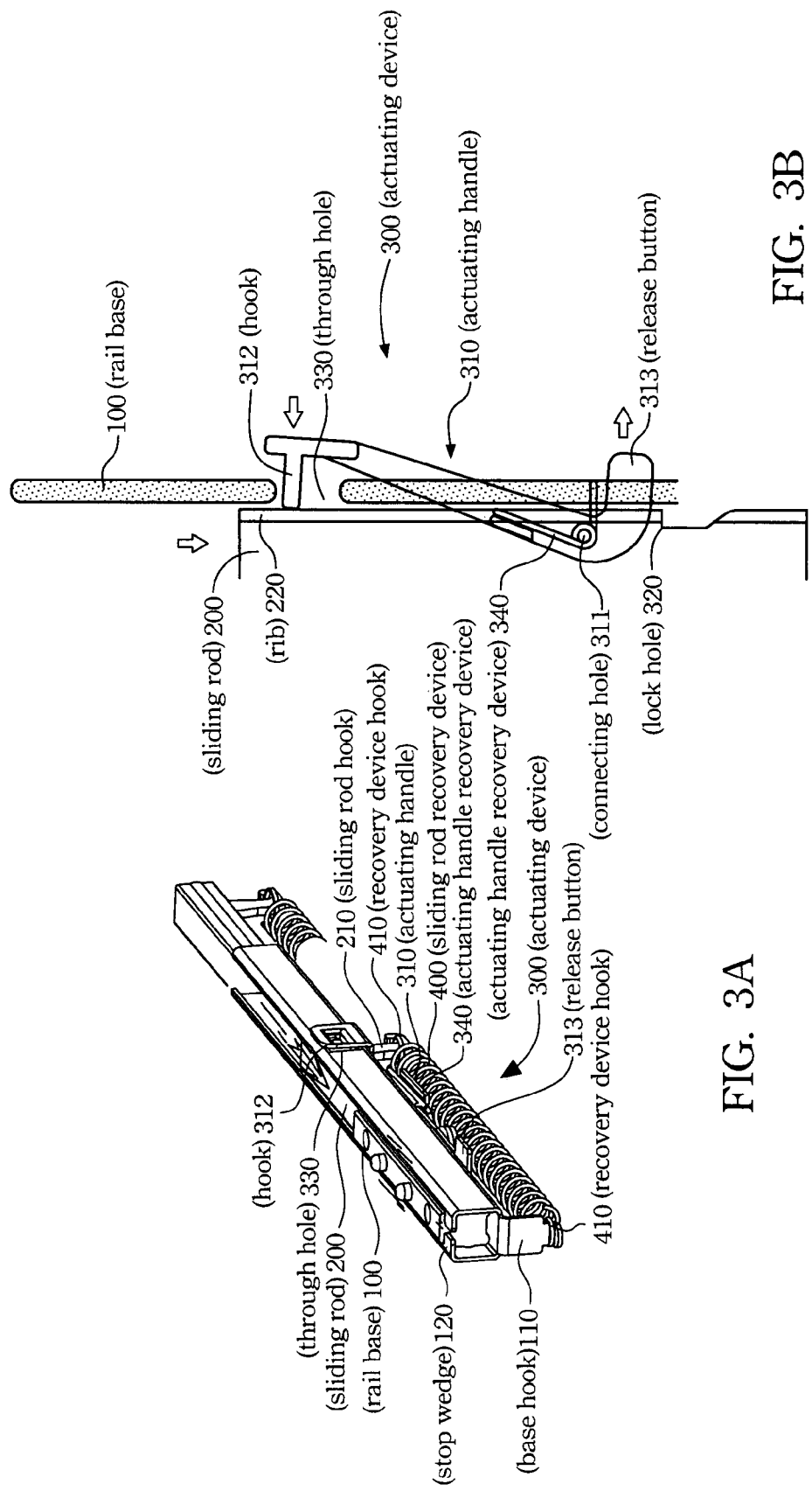
FIG. 3A is a three-dimensional view of sliding the sliding rod in the disclosed automatic sliding mechanism.
FIG. 3B is a magnified view of the actuating device in FIG. 3A.
Figure 4A:
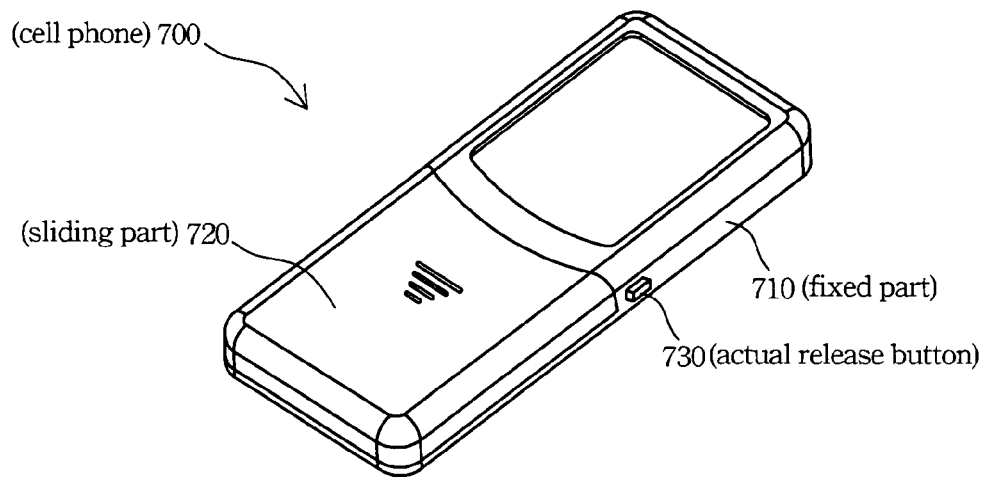
FIGS. 4A and 4B show a preferred embodiment of the invention installed on a cell phone with a down-sliding keypad cover panel, both closed and open.
Figure 4B:
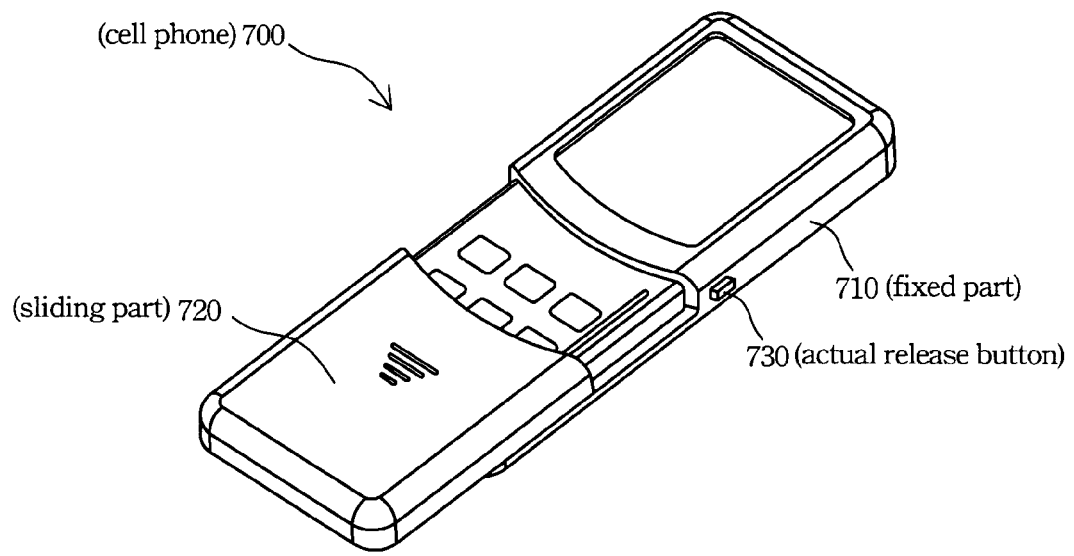
Figure 5A:
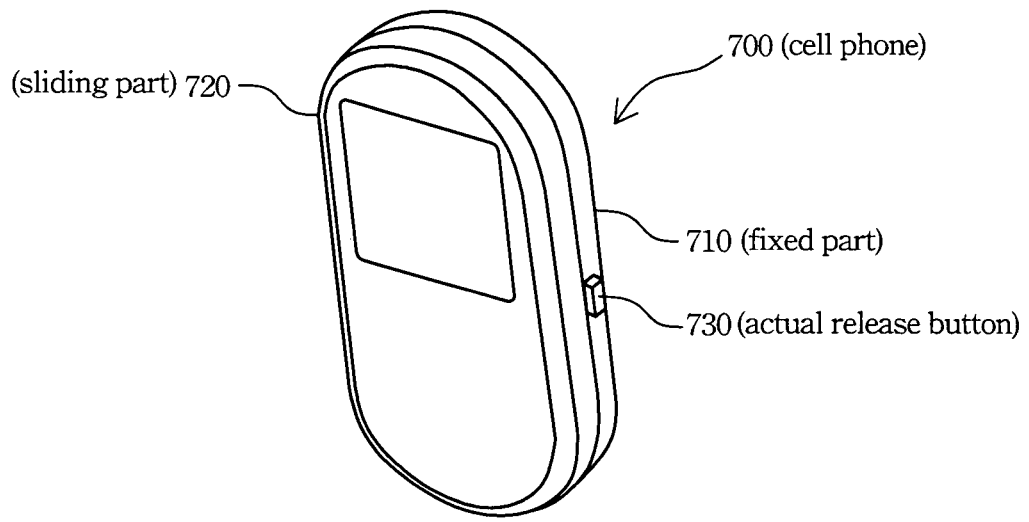
FIGS. 5A AND 5B show a preferred embodiment of the invention installed on a cell phone with a up-sliding display screen panel, both closed and open.
Figure 5B:
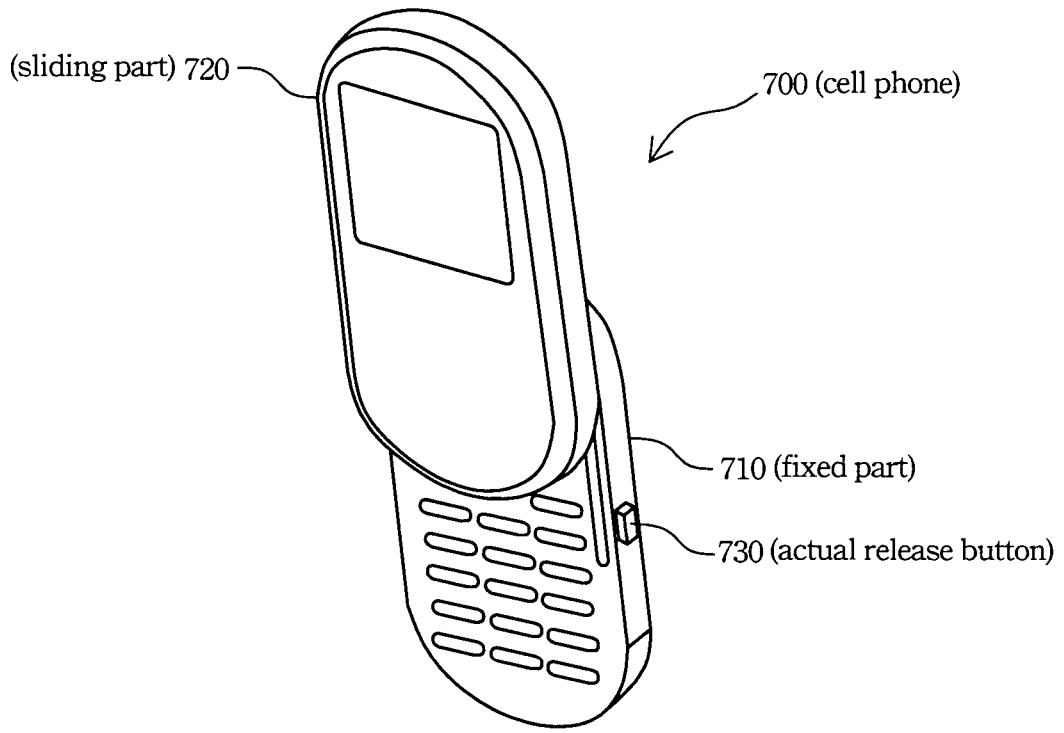

As shown in FIG. 1A, the disclosed automatic sliding mechanism contains a rail base 100, a sliding rod 200, an actuating device 300, and a sliding rod recovery device 400. The rail base 100 is formed from a metal plate, using the ridges of the metal plate to enhance the strength of the rail base 100. With reference to FIGS. 4A, 4B, 5A, and 5B, the rail base 100 is installed on a fixed part 710 of a cell phone 700. The sliding rod 200 is correspondingly installed on a sliding part 720 of the cell phone 700.

The sliding rod 200 is coupled to and slides along the rail base 100. The rail base 100 encloses the sliding rod 200 to solve the wiggling problem, enhancing the stability. The front end of the rail base 100 is provided with a stop wedge 120 to limit the sliding range of the sliding rod 200 and to prevent the sliding rod 200 from leaving the rail base 100. One side of the sliding rod 200 is formed with a rib 220 to increase the strength of the sliding rod 200.

The actuating device 300 is installed on the rail base 100. It contains an actuating handle 310, a lock hole 320, a through hole 330, and an actuating handle recovery device 340. The actuating handle 310 has a lever structure. The actuating handle 310 is formed with a connecting hole 311 to be pivotally installed at the bottom of the rail base 100. The actuating handle 310 rotates about the connecting hole 311. One side of the connecting hole 311 is formed with a hook 312 for locking the sliding rod 200. The other side of the connecting hole 311 is formed with a release button 313 to operate the actuating handle 310, rotating the whole actuating handle 310 to bring the hook 312 into rotation. The lock hole 320 is formed on one side of the sliding rod 200 for the hook 312 to lock the sliding rod 200. The through hole 330 is installed on one side of the rail base 100 so that the hook 312 locks into the lock hole 320 on the side of the sliding rod 200 via the through hole 330. The actuating handle recovery device 340 is installed at the connecting hole 311, coupling between the actuating handle 310 and the rail base 100. The actuating handle recovery device 340 is a torsion elastic device such as a spring that provides a spring force for the actuating handle 310 to rotate. The hook 312 is thus pushed to the side of the sliding rod 200, locking into the lock hole 320 thereon.

The sliding rod recovery device 400 is installed between the rail base 100 and the sliding rod 200. Recovery device hooks 410 formed on both sides of the sliding rod recovery device 400 are hooked between the base hook 110 provided on the front end of the rail base 100 and the sliding rod hook 210 provided on the rear end of the sliding rod 200. Since the sliding rod recovery device 400 is a stretching elastic device such as a spring, the sliding rod recovery device 400 in its stretching state drags the sliding rod hook 210 provided on the rear end of the sliding rod 200 when the sliding rod 200 unlocks. The sliding rod 200 moves along the rail base 100 toward the base hook 110. The sliding rod recovery device 400 is provided between the rail base 100 and the sliding rod 200 and the recovery device hooks 410 hook onto the base hook 110 and the sliding rod hook 210. Therefore, it has the function of preventing the sliding rod 200 from leaving out of the rear end of the rail base 100.

Please refer to FIGS. 2A, 2B, 3A, and 3B. When unlocking the sliding rod 200, a pressure is imposed on the actual release button 730 provided on a side surface of the fixed part 710 of the cell phone 700. The release button 313 receives the pressure so that the actuating handle 310 rotates about the connecting hole 311, making the hook 312 leave the lock hole 320. The sliding rod recovery device 400 is a stretching elastic device. In its stretching state, it drags the sliding rod hook 210, making the sliding rod 200 move along the rail base 100 toward the base hook 110. Once the sliding rod 200 touches the stop wedge 120, it stops and this completes the unlocking.

When operating the release button 313, a force is simultaneously imposed on the actuating handle recovery device 340. The actuating handle recovery device 340 is deformed to store the energy. When releasing the release button 313, the actuating handle recovery device 340 turns the stored energy into a spring force to rotate the actuating handle 310 about the connecting hole 313. The front end of the hook 312 tightly touches against the side of the sliding rod 200.

To lock the sliding rod 200 with the hook 312, one pushes the sliding rod 200 to slide along the rail base 100 toward the rear end of the rail base 100. At this moment, a force is imposed on the sliding rod recovery device 400 between the sliding rod 200 and the rail base 100. The sliding rod recovery device 400 stretches to store the energy, providing the spring force needed for the next release of the sliding rod 200.

The front end of the hook 312 touches tightly against the side of the sliding rod 200 when the sliding rod 200 is unlocked. The front end of the hook 312 loses the stopping force from the sliding rod 200 when the sliding rod 200 is pushed along the rail base 100 so that the lock hole 320 is moved with the sliding rod 200. The actuating handle recovery device 340 continues the release the stored energy into a spring force. The hook 312 locks into the lock hole 320 to fix the sliding rod 200. This completes the locking of the sliding rod 200.

The disclosed technique can be implemented in various ways. For example, the sliding direction of the sliding rod 200 is not limited to the downward one in the above embodiment. As shown in FIGS. 4A and 4B, and 5A and 5B, the invention can be used in cell phones whose keypad cover panel slides downward and whose display screen panel slides upward, respectively. Based upon the spirit disclosed herein, the invention can be used in devices with arbitrary sliding directions.

Figure 6A:
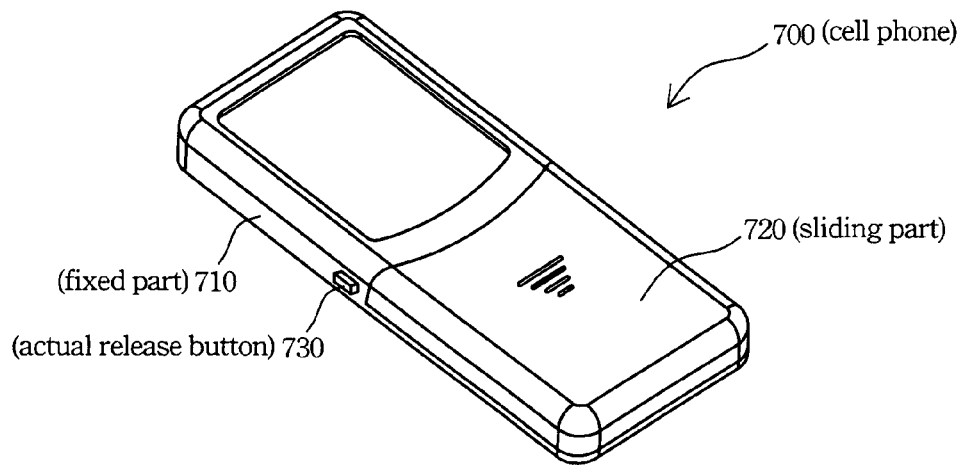
FIGS. 6A and 6B show the appearance of a preferred embodiment of the disclosed automatic sliding mechanism installed on the left-hand side of a cell phone.
Figure 6B:
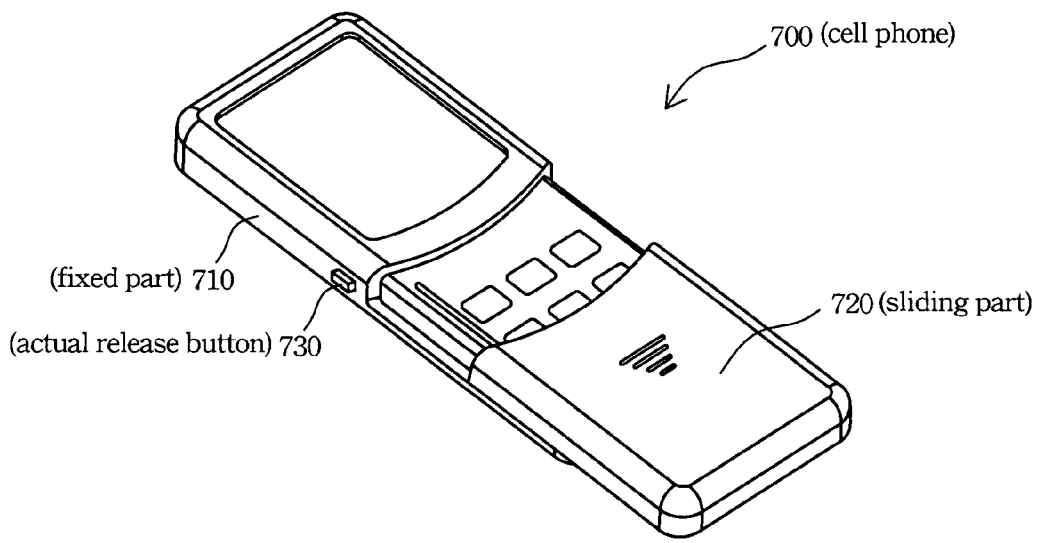
Figure 7:
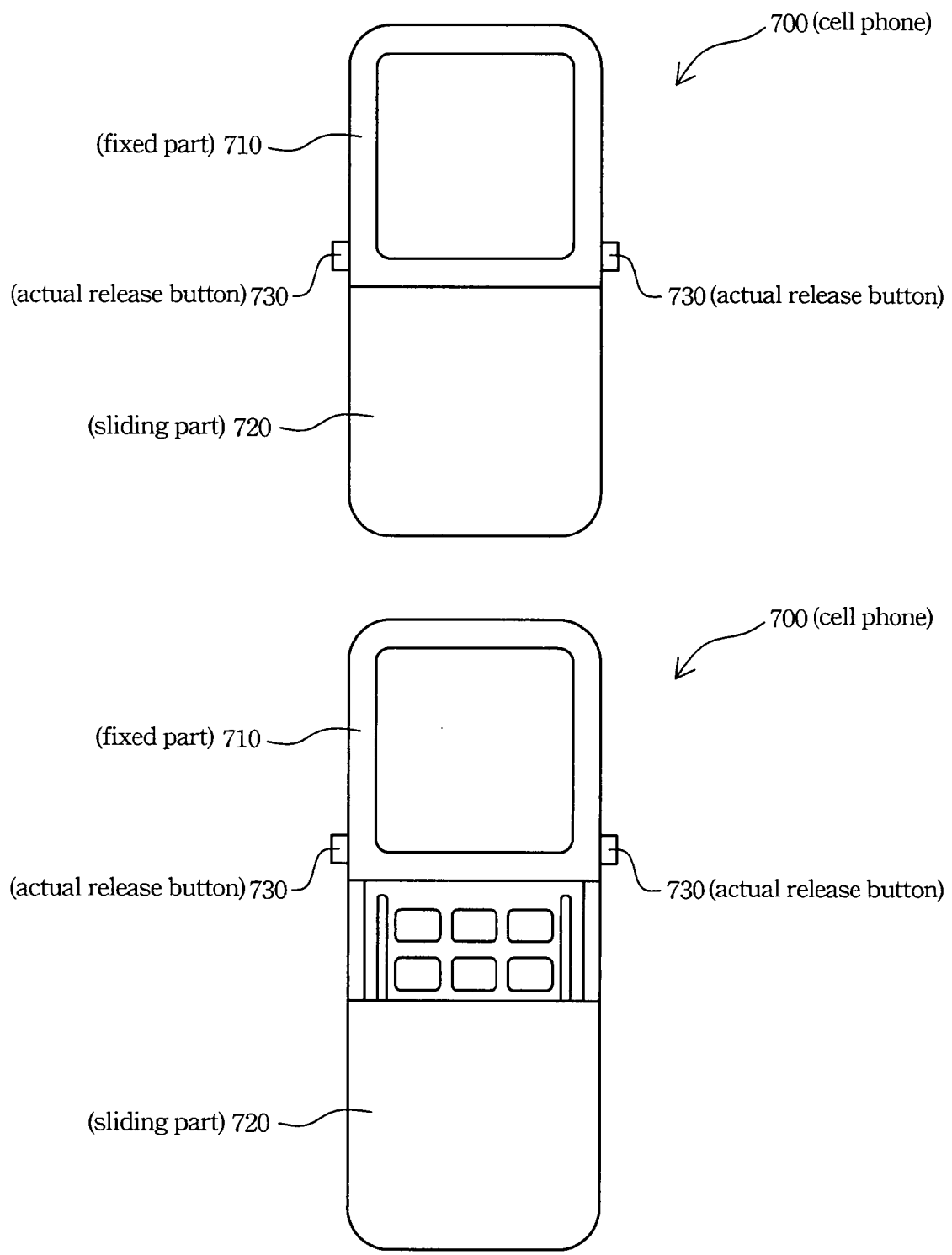
FIG. 7 is a schematic view of another preferred embodiment of the disclosed automatic sliding mechanism installed on both sides of a cell phone.

In all the above figures, we use embodiments with the actuating device 300 installed on the right-hand side of the rail base 100. However, the installation position of the actuating device 300 is not specified by the invention. For example, the actuating device installed on the right-hand side of the cell phone in FIGS. 4A and 4B can be installed on the left-hand side of the rail base 100 too, as shown in FIGS. 6A and 6B. For actuating a heavier sliding part, one can install the disclosed automatic sliding mechanism on both sides of the same device, as shown in FIG. 7. The shapes of various components in the invention are not limited to the ones shown in the drawings. The components with any shapes can be used as long as they have the functions described in the specification. Such modifications should be considered as part of the invention.

From the above embodiments, one sees that the invention has the following advantages:

1. The user can operate the actual release buttons provided by the fixed part of the cell phone without changing the gesture of holding the cell phone. The release button of the actuating device is triggered to let the sliding part automatically slide open.

2. The rail base encloses the sliding rod to solve the wiggling problem, increasing the stability of the automatic sliding mechanism.

3. The ridge formed from the metal plate enhances the strength of the rail base. The design of the rib on the side of the sliding rod further strengthens the structure so that the invention can be used in a heavier device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An automatic sliding mechanism, comprising:
   a sliding rod, which is installed on a sliding part of a device;
   a rail base, which is installed on a fixed part of the device, wherein the rail base is coupled to the sliding rod for the sliding rod to slide along the rail base and the rail base encloses the sliding rod to increase the stability of the automatic sliding mechanism;
   an actuating device, which is installed on the rail base for locking and unlocking the sliding rod; and a sliding rod recovery device, which is installed between the rail base and the sliding rod to provide a spring force for sliding the sliding rod and to prevent the sliding rod from sliding out of the rail base;
wherein the actuating device contains an actuating handle which is a lever structure installed on the rail base for locking and unlocking the sliding rod, the actuating handle having:
a connecting hole, which is formed on the actuating handle for pivotally installing the actuating handle at the bottom of the rail base, rotating about the connecting hole;
a hook, which is formed on one side of the connecting hole for locking the sliding rod; and
a release button, which is formed on the other side of the connecting hole for rotating the actuating handle and thus the hook.

2. The automatic sliding mechanism of claim 1, wherein the rail base contains a plurality of ridges formed from a metal plate to enhance the strength of the rail base.

3. The automatic sliding mechanism of claim 1, wherein the rail base further contains:
a stop wedge, which is formed on the front end of the rail base to restrict the sliding range of the sliding rod and to prevent the sliding rod from sliding out of the rail base; and
a base hook, which is formed on the front end of the rail base for hooking the sliding rod recovery device.

4. The automatic sliding mechanism of claim 1, wherein the sliding rod further contains:
a rib, which is installed on one side of the sliding rod to enhance the strength of the sliding rod; and
a sliding rod hook, which is installed on the rear end of the sliding rod for hooking the sliding rod recovery device.

5. The automatic sliding mechanism of claim 1, wherein the actuating device further contains:
a lock hole, which is formed on one side of the sliding rod for the hook to lock in, fixing the sliding rod;
a through hole, which is formed on the side of the rail base for the hook to lock into the lock hole on the side of the sliding rod via the through hole; and
an actuating handle recovery device, which is installed at the connecting hole, coupling between the actuating handle and the rail base, to provide a spring force for rotating the actuating handle, pushing the hook toward the side of the sliding rod.

6. An automatic sliding mechanism, comprising:
a sliding rod, which is installed on a sliding part of a device and contains a rib installed on the side of the sliding rod to enhance its strength;
a rail base, which is installed on a fixed part of the device, wherein the rail base is coupled to the sliding rod for the sliding rod to slide along the rail base, encloses the sliding rod to increase the stability of the automatic sliding mechanism and contains a plurality of ridges formed from a metal plate for enhancing the strength of the rail base;
an actuating device, which is installed on the rail base for locking and unlocking the sliding rod and contains an actuating handle that is a lever structure containing:
a connecting hole, which is formed on the actuating handle for pivotally installing the actuating handle at the bottom of the rail base, rotating about the connecting hole;
a hook, which is formed on one side of the connecting hole for locking the sliding rod; and
a release button, which is formed on the other side of the connecting hole for rotating the actuating handle and thus the hook; and
a sliding rod recovery device, which is installed between the rail base and the sliding rod to provide a spring force for sliding the sliding rod and to prevent the sliding rod from sliding out of the rail base.

7. The automatic sliding mechanism of claim 6, wherein the rail base contains:
a stop wedge, which is formed on the front end of the rail base to restrict the sliding range of the sliding rod and to prevent the sliding rod from sliding out of the rail base; and
a base hook, which is formed on the front end of the rail base to hook the sliding rod recovery device.

8. The automatic sliding mechanism of claim 6, wherein the sliding rod contains a sliding rod hook formed on the rear end of the sliding rod to hook the sliding rod recovery device.

9. The automatic sliding mechanism of claim 6, wherein the actuating device further contains:
a lock hole, which is formed on one side of the sliding rod for the hook to lock in, fixing the sliding rod;
a through hole, which is formed on the side of the rail base for the hook to lock into the lock hole on the side of the sliding rod via the through hole; and
an actuating handle recovery device, which is installed at the connecting hole, coupling between the actuating handle and the rail base, to provide a spring force for rotating the actuating handle, pushing the hook toward the side of the sliding rod.

10. An automatic sliding mechanism, comprising:
a sliding rod, which is installed on a sliding part of a device and contains a rib installed on the side of the sliding rod to enhance its strength;
a rail base, which is installed on a fixed part of the device, wherein the rail base is coupled to the sliding rod for the sliding rod to slide along the rail base, encloses the sliding rod to increase the stability of the automatic sliding mechanism, and contains:
a plurality of ridges formed from a metal plate for enhancing the strength of the rail base; and
a stop wedge, which is formed on the front end of the rail base to restrict the sliding range of the sliding rod and to prevent the sliding rod from sliding out of the rail base;
an actuating device, which is installed on the rail base for locking and unlocking the sliding rod; and
a sliding rod recovery device, which is installed between the rail base and the sliding rod to provide a spring force for sliding the sliding rod and to prevent the sliding rod from sliding out of the rail baser;
wherein the actuating device contains:
an actuating handle, which is a lever structure installed on the rail base for locking and unlocking he sliding rod and contains:
a connecting hole, which is formed on the actuating handle for pivotally installing the actuating handle at the bottom of the rail base, rotating about the connecting hole;
a hook, which is formed on one side of the connecting hole for locking the sliding rod; and
a release button, which is formed on the other side of the connecting hole for rotating the actuating handle and thus the hook;
a lock hole, which is formed on one side of the sliding rod for the hook to lock in, fixing the sliding rod;

a through hole, which is formed on the side of the rail base for the hook to lock into the lock hole on the side of the sliding rod via the through hole; and an actuating handle recovery device, which is installed at the connecting hole, coupling between the actuating handle and the rail base, to provide a spring force for rotating the actuating handle, pushing the hook toward the side of the sliding rod.

11. The automatic sliding mechanism of claim 10, wherein the sliding rod contains a sliding rod hook formed on the rear end of the sliding rod to hook the sliding rod recovery device.

12. The automatic sliding mechanism of claim 10, wherein the rail base contains a base hook formed on the front end of the rail base to hook the sliding rod recovery device.

* * * * *